United States Patent [19]

Edwards et al.

[11] Patent Number: 4,672,383

[45] Date of Patent: Jun. 9, 1987

[54] CRAFT GUIDANCE SYSTEM

[76] Inventors: James D. Edwards; Constance M. Edwards, both of 59 Cooden Drive, Bexhill-on-Sea, Sussex BN39 3AY, United Kingdom

[21] Appl. No.: 838,160

[22] Filed: Mar. 10, 1986

Related U.S. Application Data

[63] Continuation-in-part of Ser. No. 546,743, Oct. 27, 1983, abandoned.

[30] Foreign Application Priority Data

Oct. 30, 1982 [GB] United Kingdom ............... 8231097

[51] Int. Cl.$^4$ ................................................ G01S 1/24
[52] U.S. Cl. .................................. 342/394; 342/387; 342/396
[58] Field of Search .............. 342/387, 388, 389, 391, 342/393, 394, 395, 396, 397

[56] References Cited

U.S. PATENT DOCUMENTS 3,573,829  4/1971  Johnson ............................. 342/394

Primary Examiner—Theodore M. Blum
Assistant Examiner—David Cain
Attorney, Agent, or Firm—Steele, Gould & Fried

[57] ABSTRACT

A craft guidance system 200 has signal transmission stations AB, CD, AC operable to provide three intersecting hyperbolic lattices 21, 20, 120. One transmission station pair AB provides a moving lattice 21 which travels at the same speed and in the direction of the craft 22 using the system. The other station pairs CD, AC provide fixed lattices 20, 120. Equipment (FIG. 5) carried by the craft 22 operates whereby, when translated by reference to the phase difference between the transmissions of each pair AB, CD, AC, the lattices 21, 20, 120 provide hyperbolic lines of position continuously in time at infinitely variable positions. The moving lattice 21 is caused to travel at the intended speed and in the direction of the craft 22. The fixed lattice 20 provides craft track guidance; and both fixed lattices together provide craft position fixes. The fixed lattice 20 and the moving lattice 21 together provide craft moving position guidance; the moving lattice 21 provides craft speed guidance.

8 Claims, 12 Drawing Figures

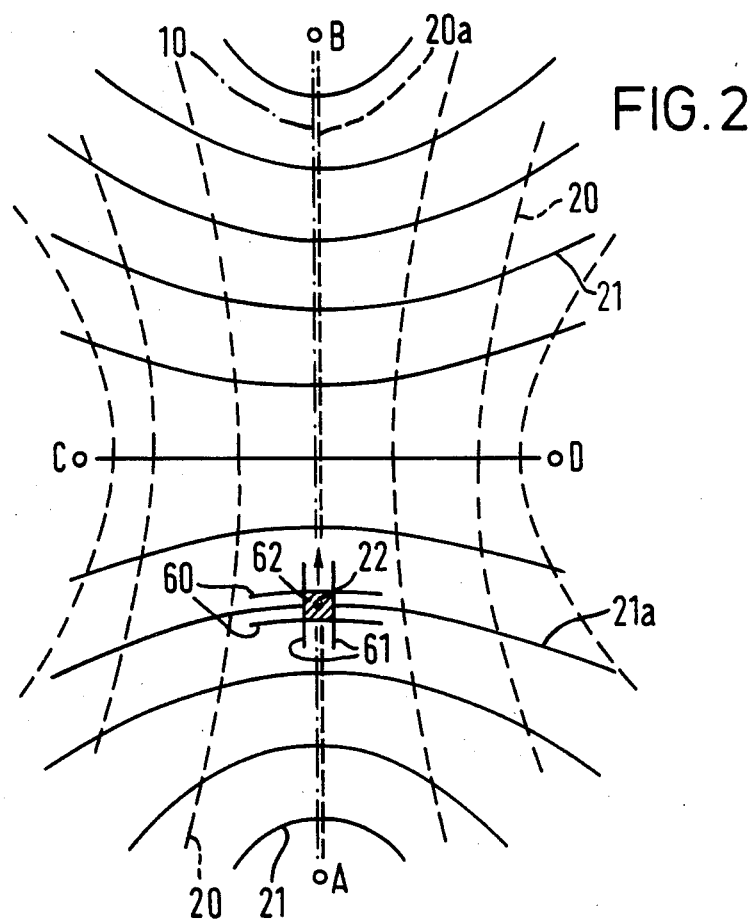

CRAFT GUIDANCE SYSTEM

This application is a continuation-in-part of application Ser. No. 546,743, filed Oct. 27, 1983, now abandoned.

BACKGROUND TO THE INVENTION

This invention relates to craft guidance systems and is concerned with craft guidance systems using transmitting stations transmitting signals which are received by mobile objects (herein conveniently called "craft") to aid the navigation of those craft.

Many such systems are known (e.g. GEE: DECCA NAVIGATOR: LORAN: OMEGA: CONSOL) in which craft guidance is derived from intersecting hyperbolic lattices. These have become known as hyperbolic systems. The hyperbolae of the lattices are loci of constant phase difference.

The present invention is also a hyperbolic system. It greatly extends the aid which can be derived from known hyperbolic systems in that it may provide continuously, in real time, intended moving positions for craft to follow and control signals to assist them to do so. The movement of such positions may be coordinated and maintained at specific intervals while the speed of movement may be fixed or variable in more than one direction. Communications are provided to pass system information and inform a control centre of the navigational state of craft.

SUMMARY OF THE INVENTION

According to the invention, a craft guidance system has signal transmission station pairs operable to provide at least three intersecting hyperbolic lattices, one moving, the other two fixed, relative to each other, means whereby when translated by reference to the phase differences between the transmissions of each station pair, the lattices produce hyperbolic lines of position continuously in time at infinitely variable positions, the moving lattice travelling at the intended speed and in the direction of the craft using the system, one of the fixed lattices providing craft track guidance, and both fixed lattices together providing craft position fixes, the said one fixed lattice and the moving lattice together providing craft moving position guidance and the moving lattice providing craft speed guidance.

The signal transmitting stations may be fixed to earth or carried by earth satellites or ships.

One perferred form of the system has a control centre operable to send system information to craft being aided, the centre employing a data communications channel which is multiplexed on the carrier frequency of at least one of the transmitting stations.

Means may be carried by the craft for the communicated information, having an output providing automatic control for guidance and speed of the craft. Such means may include receivers, demodulators and comparators in the craft to employ the phase differences between the transmissions of each station pair and the multiplexed data communications channel, and means whereby these transmissions are filtered into respective demodulators so that the said demodulators and comparators derive the phase differences from the lattices so as to determine craft speed, track and position fixes.

The invention provides a system which may be employed to control a stream of craft so that data derived from the signal transmitting stations is locked to a common time reference whereby craft in the stream are maintained at regulated intervals with respect to each other.

The craft may be provided with means for automatically communicating with a control centre periodically to report on the position of the craft in the system, using geographical or other coordinates together with lateral, axial, and, where appropriate, vertical errors from datum points and a warning in the event of departure from said datum points or other deviant situations.

The system may be provided with, in a geographical or geometrical sense, at least two secrtions, having means to control the movement of craft synchronously between sections.

Craft may be controlled at different speeds on different tracks in any one section.

Tracks for craft having a vertical separation may be defined by the system.

The system may be used to produce coordinates for moving positions which craft using the system are intended to maintain by measuring errors between actual and intended positions to derive courses and speeds to reach said intended positions.

A track may be defined by a straight or curved hyperbolic lattice line.

A track may be computed in terms of fixed intersecting hyperbolic lattices.

A track may be defined by use of any suitable known technology.

Signals from the signal transmitting stations may be propagated by modulation of carrier frequencies.

Signals from the signal transmitting stations may be of both low and high frequencies so as to establish respectively coarse and fine lattices.

A single frequency signal at one of a pair of signal transmitting stations may be used to trigger a number of signals of differing frequency at the other of the pair of transmitting stations.

Said number of signals may be multiplexed onto a single carrier frequency.

Compensation of the doppler effect may be applied to the channel frequencies used in said multiplexing.

Correct phase difference between transmissions from a pair of signal transmitting stations may be achieved by use of a goniometer.

A system may have on the craft:
(a) means for receiving signals transmitted from the pairs of signal transmitting stations;
(b) a first phase comparator for resolving craft navigational fix from the received signals;
(c) a second phase comparator for resolving craft track guidance; and
(d) a third phase comparator for resolving craft position and speed along its track.

Said second and third phase comparators may be used by computer means to define a moving position slot, and a display used to present both craft position and slot.

The speed of the moving lattice may be varied such that a craft can be taken through a stage of speed change which may include a reduction to, or acceleration from, zero speed, or a reversal of the direction of movement and control is exercised either from a control centre or from a craft. For the purposes of passing from one geographical section to the next, slots from both sections may be caused to coincide thereby to generate a transit gate. The signal transmitting stations may transmit with continuous wave or with pulse transmissions. On the craft, the signals received from the transmitting stations may be, by option, manually or automatically employed to control the craft. The rate of phase change between the transmissions of the signal transmitting stations may be varied either to counter change of speed produced by the expansion factor or to produce a desired change of speed.

The system may be combined with a craft either not equipped to receive transmissions from the signal transmitting station pairs or temporarily beyond the range thereof in which cases a control centre transmits data to the craft to enable it to operate as though it were so equipped and within normal range.

The system may use differential lattices, that is a pair of lattices each with a different pitch, produced by transmissions from the same pair of transmitting stations, to give graduation of position lines equal to that of the lattice with the smaller pitch and elimination of ambiguity over a number of lanes of the lattice with the larger pitch.

In one form of invention, signal transmitting station pairs are arranged to generate static and dynamic hyperbolic lattices of phase difference to assist in the control and guidance of craft receiving those signals. The craft may be moving singly or in streams on land, on or in water or other liquid, or in aerospace at regulated speeds and, where appropriate, at regulated intervals within lanes, corridors, channels or other specified controlled space. The transmitting stations may also transmit communication information for craft to use in maintaining correct tracks, speeds and horizontal separation from other craft (if any) under control. Receivers in the craft may give output for manual translation and electronic output for automatic control of the speeds and tracks of the craft. Suitable craft are, for example, motor land vehicles, ships and boats, hovercraft, submersibles and aeroplanes. It will be appreciated that the system can be used to guide individual craft but can also be used to guide a plurality of craft at the same time.

In a system, such as described below involving traffic streams, all data for the craft in each stream of traffic is locked to a common time reference to reduce errors which could arise from static navigation data obtained by different craft from a variety of uncoordinated navigation aid systems.

Whilst craft are under control by the system, they may communicate to a control centre automatically at fixed intervals to report on the progress of the craft and, when appropriate, give notification of untoward events with appropriate alarm signals.

The system may comprise one or more geographical or geometrical track sections with guidance, communications and control facilities. Where the system includes a plurality of sections each controlled with its own lattices, the movement of craft in adjacent sections are mutually synchronised to ensure smooth passage from each section to the next without delay. The system can provide facilities for the conduct of craft at different speeds on different tracks within a given section according to the capabilities of the craft in that section and general requirements. The tracks may be separated vertically or horizontally; the locations of the horizontally separated tracks being defined by the system. The separate vertical heights—or depths—may be defined by the system or alternatively may be defined by reference to other instruments (such as altimeters or depth gauges) in the craft. Track sections may be straight or curved. The system can produce coordinates for moving positions which the craft are intended to maintain. Craft then measure the error between their actual position and intended moving position to derive the corrections of course and speed necessary to reach the intended moving position. The moving positions provided for craft which share a common path are coordinated to ensure the required interval between them. The disadvantages of known systems is that they do not give to craft continuously their intended moving positions nor provide aid for manual or automatic control of the craft to maintain their intended moving positions. They do not provide automatic coordination between craft nor speed regulation. Neither do they transmit to the control centre the navigational state of craft relative to intended moving positions. In other systems the comparison frequencies or harmonics of them are usually transmitted as radio frequencies. As a result, either technical compromise or difficulty in obtaining frequency allocation may occur. Most other systems could not be used within water or other liquids nor could they be used for movement control as opposed to navigation.

DETAILED DESCRIPTION OF THE DRAWINGS

Figure 3:
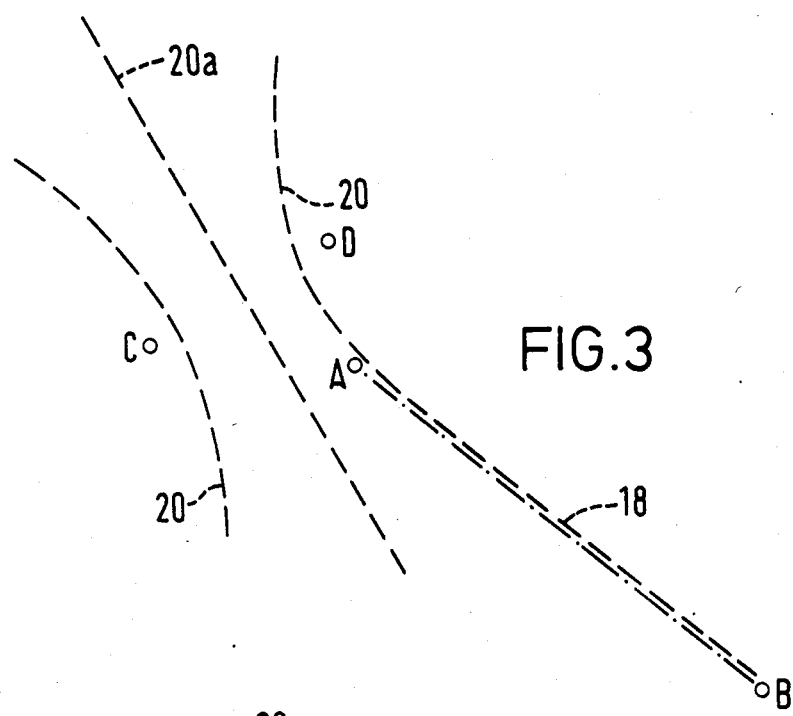
Figure 4:
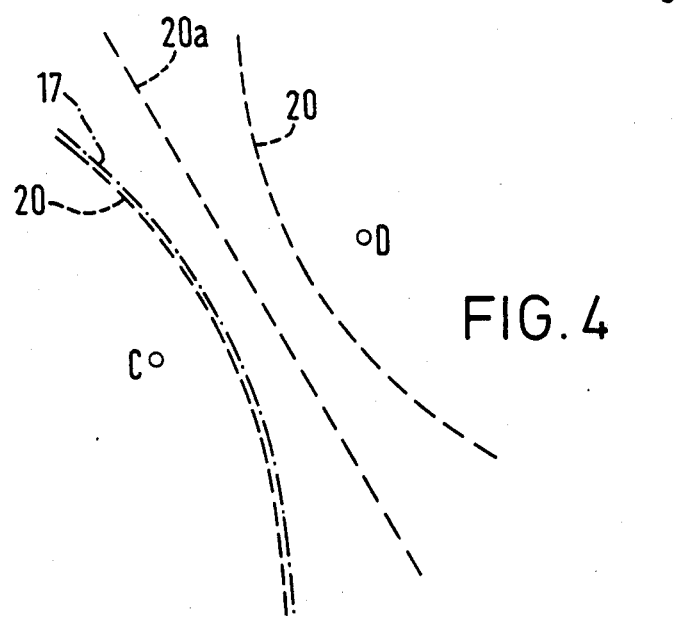
Figure 5:
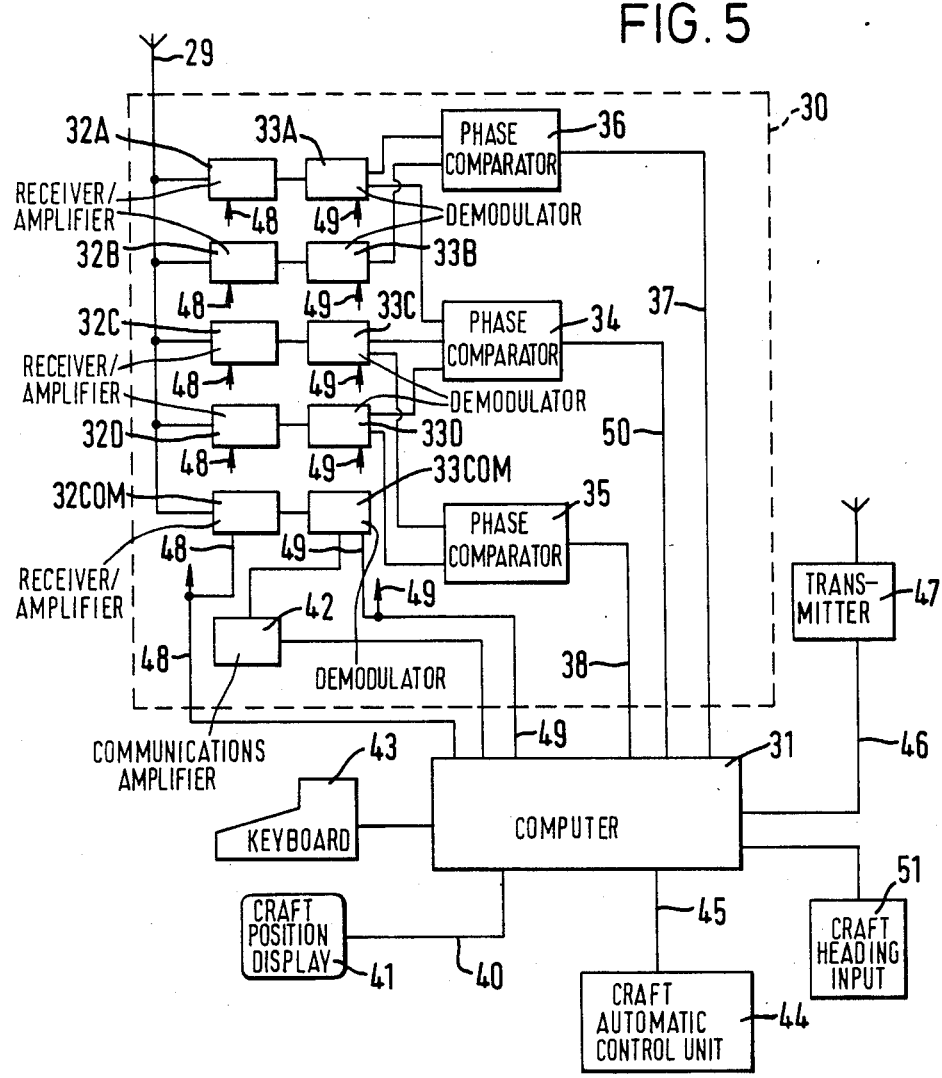
Figure 6:
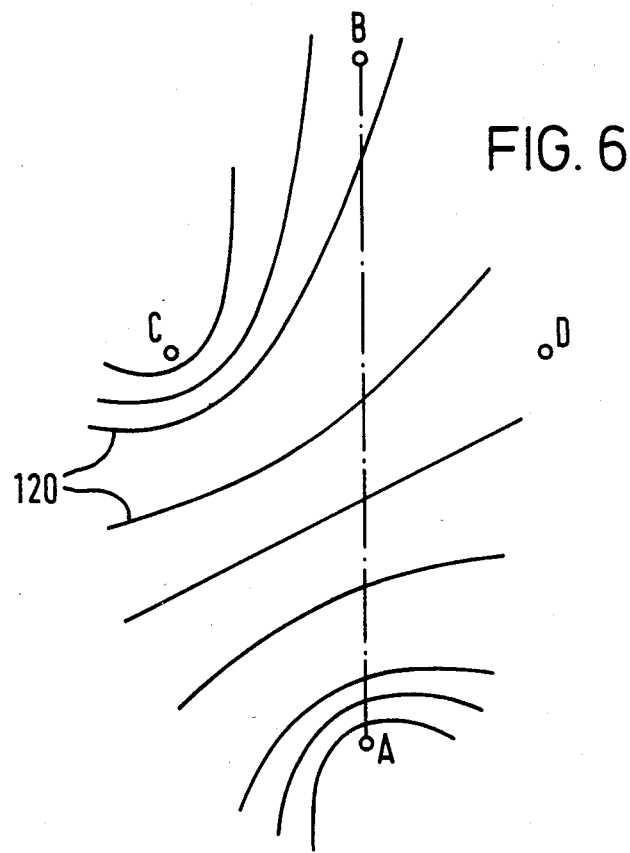
Figure 7:
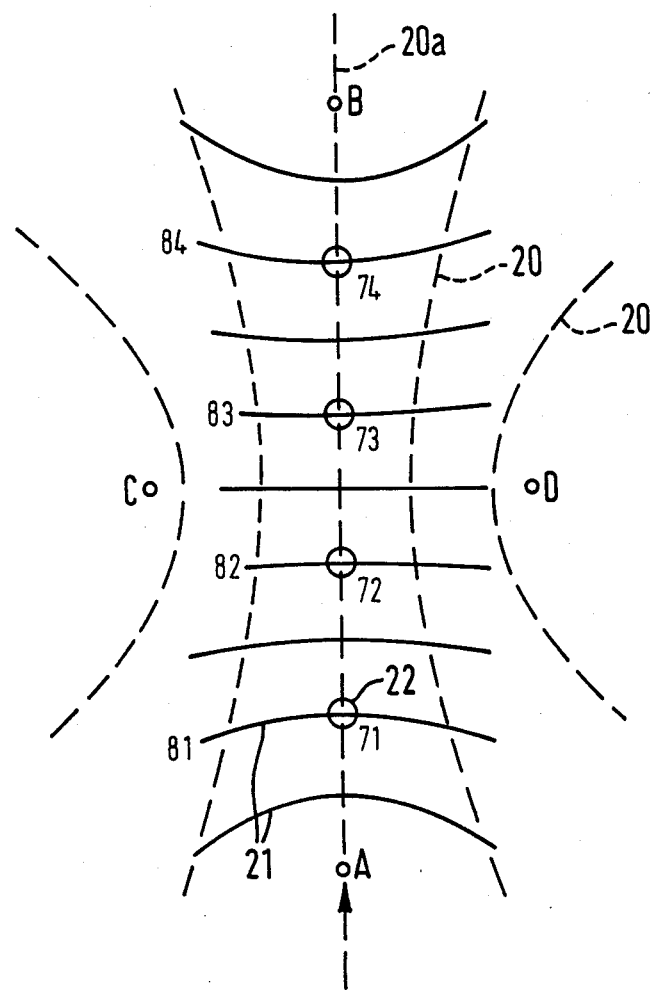
Figure 8:
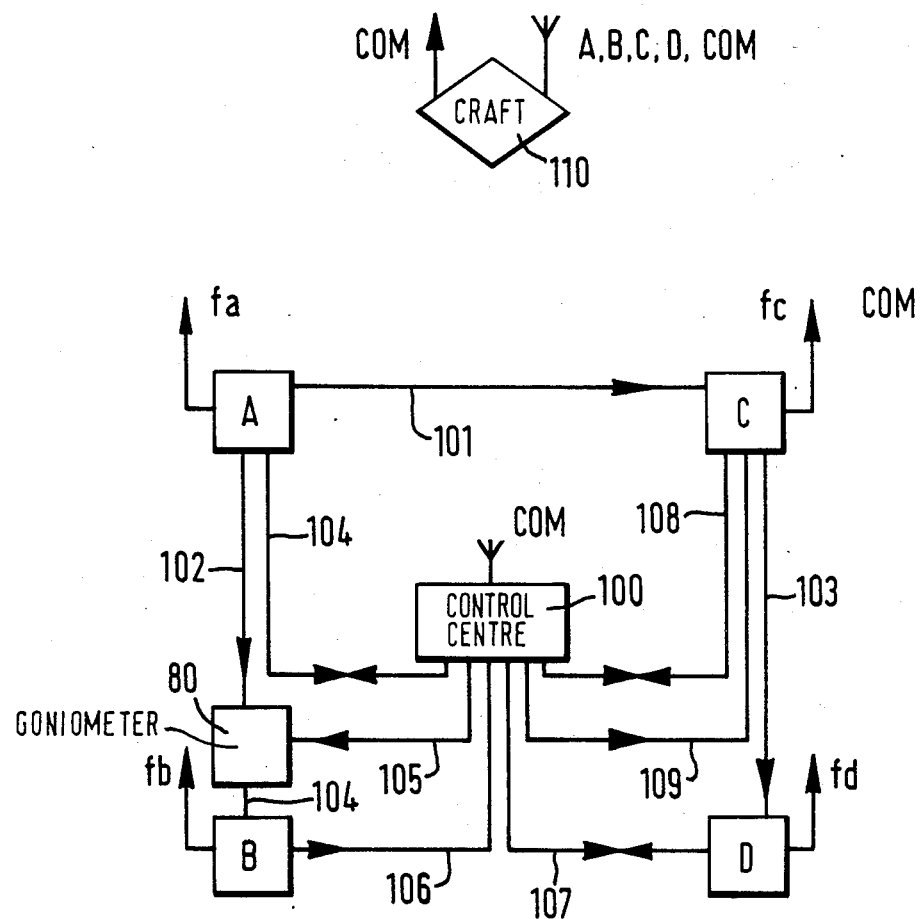
Figure 9:
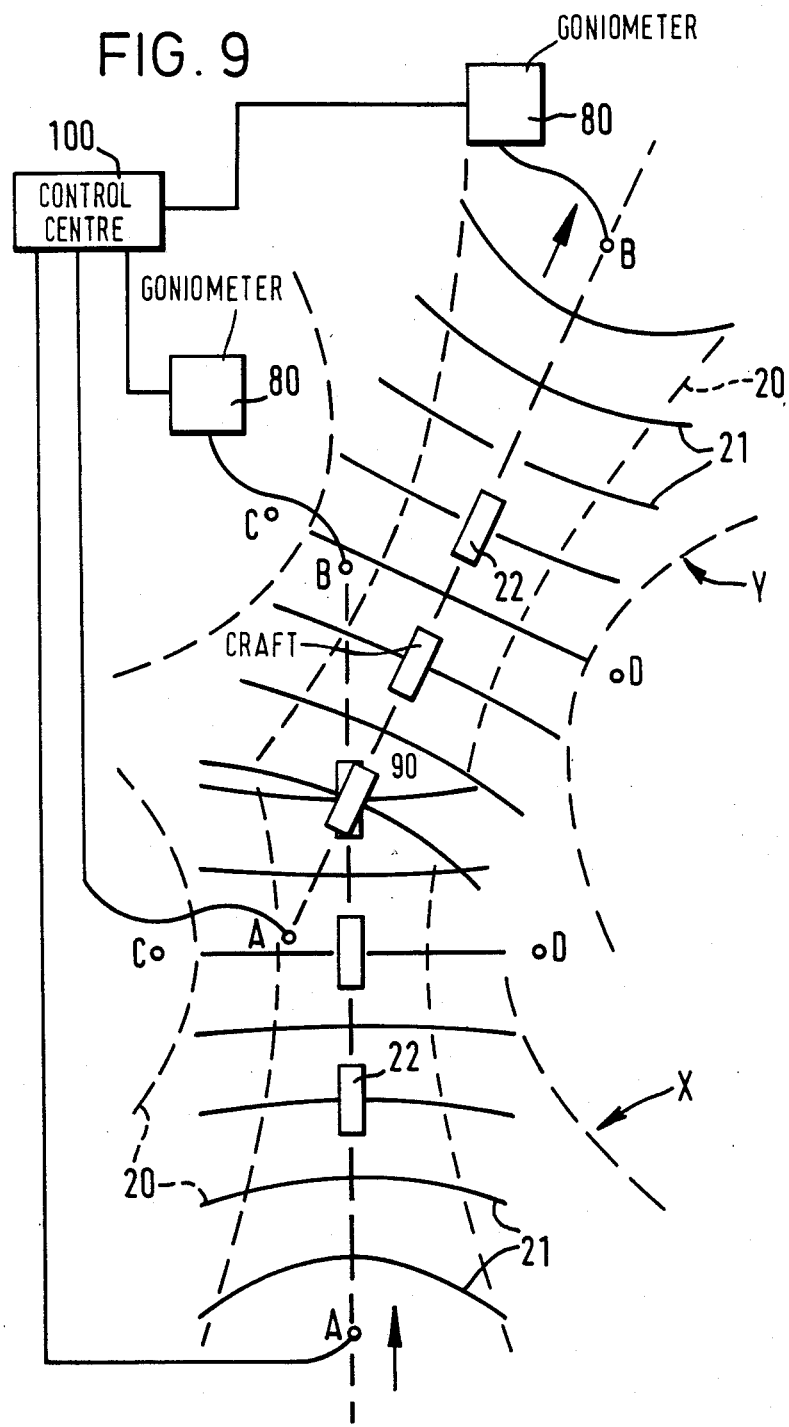
Figure 10:
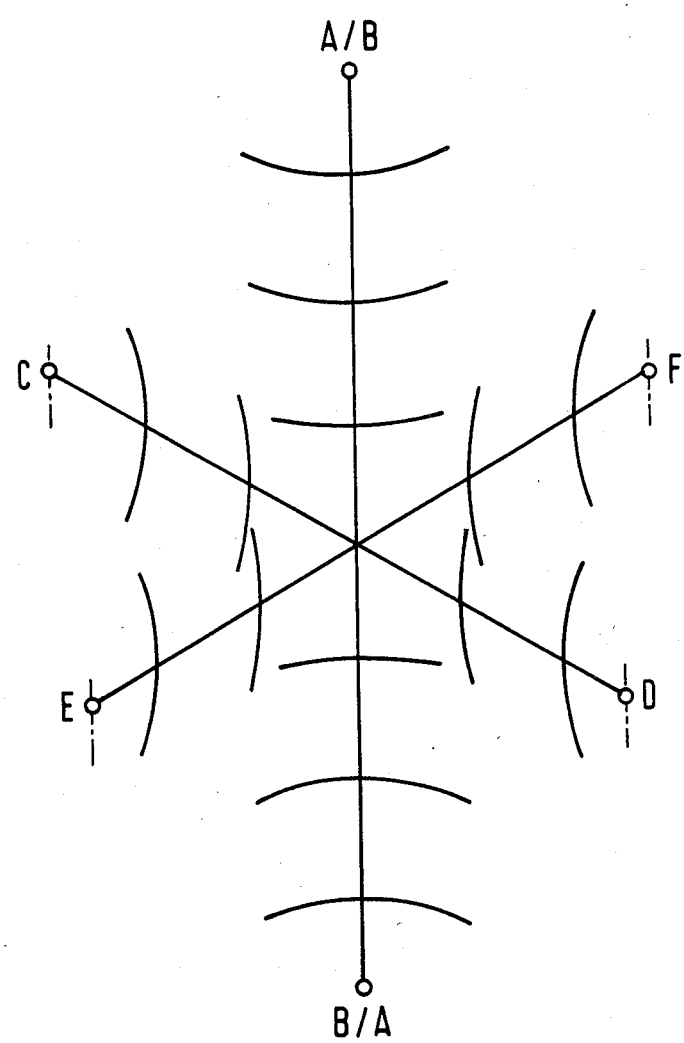
Figure 11:
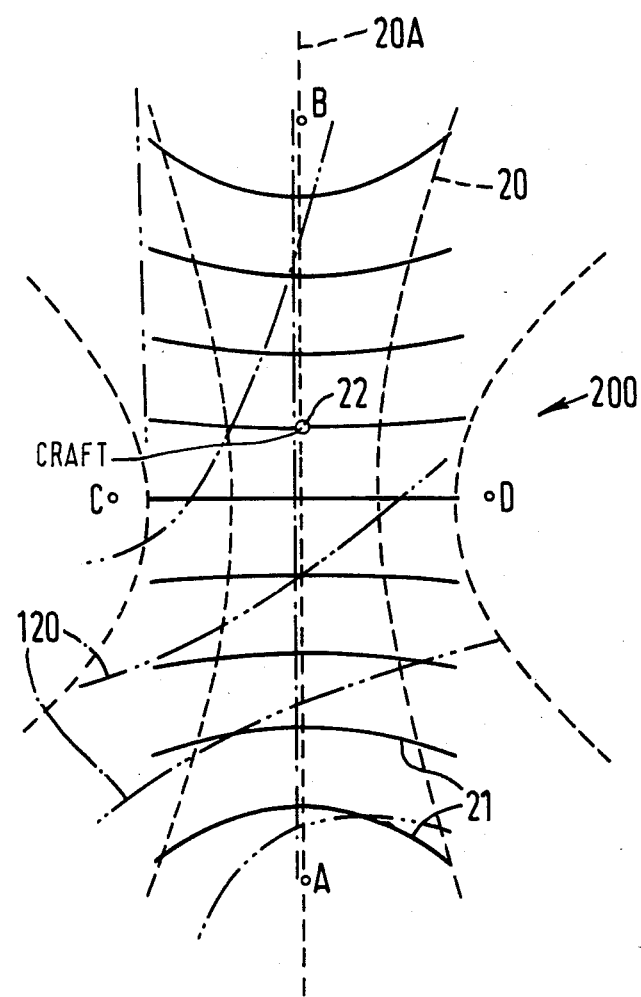
Figure 12:
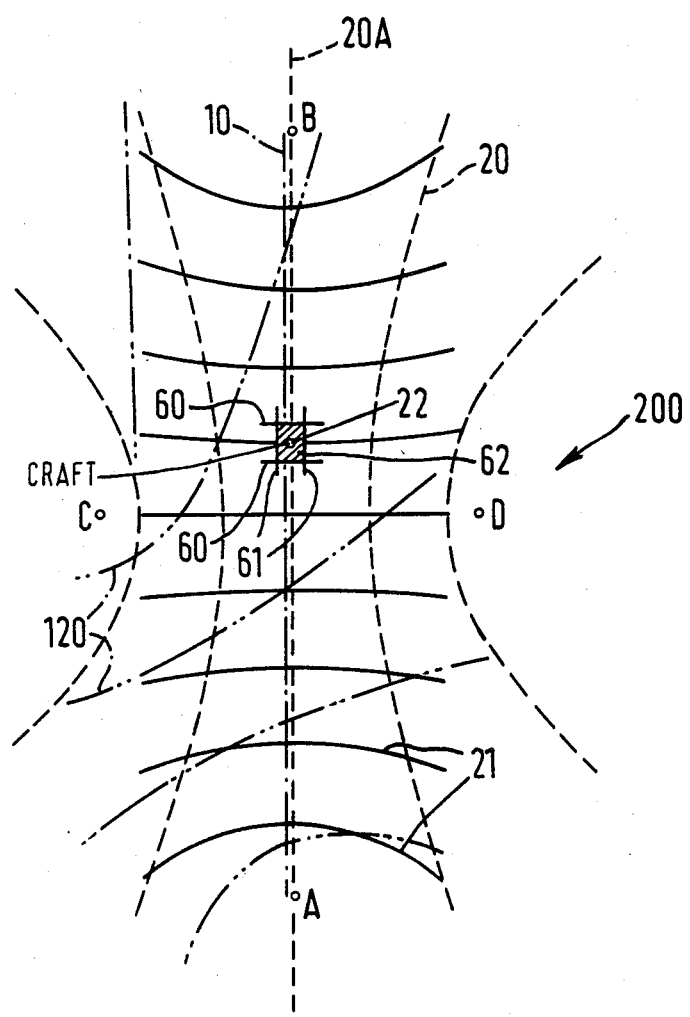

The invention will now be described by way of example only, with reference to the accompanying drawings, wherein:

FIG. 1 is a distance/phase diagram,

FIG. 2 is a diagram showing intersecting hyperbolic lattices of phase differences, FIG. 3 illustrates an asymptotic straight track, FIG. 4 illustrates a curved track, FIG. 5 is a block diagram of equipment carried on a craft, FIG. 6 illustrates a static hyperbolic lattice for fixing the position of a craft in conjunction with another lattice, FIG. 7 illustrates the coordinates of a moving position, FIG. 8 illustrates the radiation of different frequencies from two pairs of transmitting stations, FIG. 9 illustrates movement of craft between two adjacent geographical sections of the system, FIG. 10 illustrates, in a schematic manner, the arrangement for the control of craft in three dimensions, FIG. 11 illustrates a three-lattice system according to the invention, and FIG. 12 illustrates a modification of the same.

DETAILED DESCRIPTION OF THE PREFERRED EMBODIMENT

With reference first to FIG. 11, a craft guidance system 200 operates to guide a mobile craft 22 along a track 20A. The system 200 has signal transmission stations AB, CD, AC operable, (with phase differences between transmissions of each station pair), to provide three intersecting hyperbolic lattices 21, 20, 120. Lattice 21 is a moving lattice, and lattices 20 and 120 are fixed, relative to each other. Means (FIG. 5) are provided on the craft 22 whereby, when translated by reference to the phase differences between the transmissions of each station pair AB, CD, AC, the lattices produce hyperbolic lines of position continuously in time, i.e. non-periodically. The lines of position are infinitely variable. That is to say that at any position of the craft 22 within a lattice produced by a station pair, there will be a hyperbolic lattice position line resulting from the phase difference between the signal transmissions of that station pair.

The moving lattice 21 is caused to travel at the intended speed and in the direction of the craft 22. The fixed lattice 20 provides craft track guidance. Both fixed lattices 20, 120 together provide craft position fixes. The fixed lattice 20 and the moving lattice 21 together provide craft moving position guidance; the moving lattice 21 provides craft speed guidance.

FIG. 12 illustrates a modification wherein a craft guidance slot defined by area 62 is provided. The description relating to FIG. 2 explains how the area 62 is produced.

The invention will be more clearly understood with reference to the earlier figures, starting with FIG. 1.

FIG. 1 shows a base line 10 having signal transmitting stations M, N at respective ends and craft marked by arrows 11, 12 and 13 at equidistant points along the line 10. The situation is first considered where stations M and N transmit on the same frequency f and in phase, and the distance between M and N is one half a wavelength of frequency f.

The term "wavelength" is used here to refer to the distance between adjacent points of equal phase measured along the line of propagation of a continuous wave or a train of pulses. In this situation the phase difference between the signals received from M and N will be:

- −180° if the craft is at M
- −90° is the craft is at 11
- 0° if the craft is at 12
- −270° if the craft is at 13
- −180° if the craft is at N These phase differences do not change until the craft position changes.

The loci of points of fixed phase difference are static hyperbolae such as shown by dash lines 20 in FIG. 2. In FIG. 2 the signal transmitting stations M and N have been re-identified as C and D. The static hyperbolae give track guidance information as referred to below and can be referred to as craft tracks.

The situation is next considered where transmitting station N transmits on a different frequency or with a changing phase to that of station M. In this situation craft at the various points on the line 10 will, if they remain stationary, experience a changing phase difference. This is illustrated in crude step-wise form in the vertical columns M, 11, 12, 13 and N in the table below.

tified as A and B. The craft is indicated at 22. The hyperbolae have a common speed of movement along the base line AB. The table above represents a step-wise situation but in practice a smooth movement will be generated. The smooth movement will result from the transmission of two slightly different frequencies by transmitters A and B, or by the application of a progressive phase shift to one of the transmissions.

Along the base line 10 (AB in FIG. 2), the speed of movement of the lattice represented by lines 21 will at any instant be equal to $V/\phi$, when V is the velocity of propagation through the relevant medium and $\phi$ is the sum of the cycles transmitted by stations A and B during the time taken for station B to become retarded in phase by 360° relative to station A. (Thus A transmits P cycles and B transmits P−1, therefore $\phi=2P−1$). This process takes $t$ seconds $=1/(fa-fb)$. Therefore $2P-1=(fa+fb)/(fa-fb)$ and $V/\phi=V(fa-fb)/(fa+fb)$.

Thus the speed of the moving lattice may be arranged, by controlling the ratio of the difference between fa and fb to their sum, to make the moving lattice travel along the track at the speed of the craft. The actual speed of the craft is usually disturbed by natural elements but, within tolerable variations will normally remain substantially the same as that of the moving lattice.

At points away from the base line AB to speed will increase as the spacing between hyperbolae increases. (This results from the expansion effect referred to below).

The signals transmitted for the production of hyperbolae may, when technically suitable and administratively acceptable, be the actual comparison frequencies. Usually, such signals may be derived from the comparison frequencies and used, after transmission either directly or as modulation, to regenerate the hyperbolae comparison frequencies. In all cases they will be referred to as signals.

The curves in FIG. 2 are plane hyperbolae. It is believed that they are suitable for describing the principles involved in the invention.

With reference to FIG. 7, craft aided by the system will travel on a track 20A, substantially at the same speed, and in the same direction, as the moving lattice (lines 21) and will be doppler action receive transmissions of fa and fb from the signal transmitting stations A and B with identical apparent frequencies. These identical apparent frequencies will have a constant phase relationship characteristic of the moving lattice line

| PHASE OF TRANSMISSION FROM STATION M | PHASE DIFFERENCE DETECTED ON CRAFT AT: | | | | | PHASE OF TRANSMISSION FROM STATION N RELATIVE TO M |
|---|---|---|---|---|---|---|
| | M | 11 | 12 | 13 | N | |
| ZERO | −180 | −90 | 0 | −270 | −180 | ZERO |
| ZERO | −270 | −180 | −90 | 0 | −270 | −90° |
| ZERO | 0 | −270 | −180 | −90 | 0 | −180° |
| ZERO | −90 | −0 | −270 | −180 | −90 | −270° |
| ZERO | −180 | −90 | 0 | −270 | −180 | −360° |

The table also illustrates, if one looks at it diagonally from top-left to bottom-right, that a point of constant phase difference moves steadily through positions represented by M, 11, 12, 13, N in sequence as the phase at N changed relative to that at M. Thus there is set up dynamic (kinetic) hyperbolae such as shown by continuous lines 21 in FIG. 2 (which can be referred to as craft position and speed lines) with stations M and N re-idenwhich intersects the point of reception. Craft may find the moving lattice line allocated to them by seeking its characteristic phase relationship. They then travel at the speed of the moving lattice to maintain that phase relationship and consequently their correct moving position at the intersection of the allocated moving lattice line and the trackline. In this way the moving lattice lines, and the trackline (which is defined by lattice line 20a) produce coordinates (81, 82, 83, 84) for the intended moving positions, (71, 72, 73, 74), which craft using the system are intended to maintain by measuring the errors between actual and intended moving positions in order to derive course changes and speed changes so as to reach said intended positions. By this means the system may be used for controlling a stream of craft so the data derived from the signal transmitting stations A and B is locked to a common time reference whereby craft in the stream are maintained at regulated intervals with respect to each other.

The frequencies fa and fb are chosen with consideration of such factors as the geographical length of the section of track to be covered, the tolerable degree of ambiguity arising from repeated phase differences, required accuracy of position definition, the speed of the craft and the desired intervals between adjacent craft. In some cases, but not all, both "coarse" and "fine" hyperbolic lattices are required and these factors influence the choice of fa and fb. Where coarse and fine hyperbolic lattices are used, the fine lattice gives accurate fixing with the possibility of ambiguity at half wavelength intervals while the coarse lattice resolves the ambiguity with the use of its longer wavelength.

The terms "coarse" and "fine" hyperbolic lattices refer to the spacing of the hyperbolae along the base line 10. The coarse lattice, produced by low frequencies with long wavelengths, with its hyperbolae widely spaced distributes a complete set of phase values over a half wavelength distance sufficient to cover a long base line without repeated phase relationships and consequent ambiguity. A fine hyperbolic lattice is produced by higher frequencies with shorter wavelengths and has closely spaced hyperbolae which give greater accuracy, but a complete set of unique phase values covers only half of the short wavelength and ambiguous hyperbolae are produced in a base line longer than that length. Therefore, a long base line may give rise to a requirement for the use of both coarse and fine spaced hyperbolae to provide accuracy without ambiguity.

The system may use differential lattices as an alternative method to obtain the required graduation without incurring ambiguities. Differential lattices, that is a pair of lattices each with a different pitch, are produced by transmissions from the same pair of signal transmitting stations to give graduation of position lines equal to that of the lattice with the smaller pitch and elimination of ambiguity over a number of lanes of the lattice with the larger pitch. In two lattices, (call them J and K), the boundaries of the lanes, as the complete series of phase values is termed, coincide at intervals of j lanes of the J lattice and k lanes of the K lattice. If the position lines may be determined to 1/S of a lane they may be numbered from 1 to S and termed sublanes. Suitable values of j and k will cause the coincident pairs of J and K sublanes to be unique. For example, sublane (S-P)j would overlap or coincide with (S-Q)k once only within a range of j and k lanes. The receiver and comparator (30) and computer (31) in the craft may therefore measure the unique sublane pairs and determine the appropriate sublanes.

The signal fed to transmitting station A is also fed to transmitting station B and used in the generation of the signal at station B to ensure the stable relationship needed to control the speed at which the interference pattern moves. If the system is to be used to guide a plurality of craft, with groups of craft travelling at different speeds, each traffic speed used requires its corresponding frequency at transmitting station B to produce a lattice moving at the correct speed, or accelerating or decelerating as required. Thus a single frequency signal at A could trigger a number of signals of differing frequency at B. These could be multiplexed on one carrier frequency and transmitted by a single transmitting station B.

The accurate control necessary to ensure correct phase difference between fa and fb may be achieved in one of several methods. One method may use a goniometer. (See goniometer 80 of FIGS. 8 and 9). The goniometer consists of five coils arranged about the origin of the x, y and z axes. One pair of fixed coils connected in series is set coaxially on the x axis symmetrically about the origin with sufficient space between them for the fifth coil. The second set of identical coils also connected in series is similarly placed on the y axis. The fifth coil is set symmetrically about the origin so that its axis may rotate in the x-y plane about a spindle in the z axis. Frequency fa is fed into the x axis coils of a goniometer. The same frequency, with a phase shift of 90°, is fed into the y axis coils of the goniometer and the two fields produced by the two pairs of coils combine to generate a single field rotating at frequency fa. The search coil of the goniometer is rotated in the direction of the rotating field at a rotational speed equal to the required difference between fa and fb. This action produces a phase lag of one cycle per rotation of the fifth coil to give an output frequency fb at the terminals of the fifth coil. Control of this frequency adjustment is exercised by a control centre 100 (FIG. 8). FIG. 8 also shows transmitting stations A, B, C and D, frequency locking paths 101, 102, 103, monitoring control paths 104, 105, 106, 107, 108, and communications channel 109. Channel 109 carries system data from the control centre 100 to transmitting station C, where it is transmitted to a craft 110 at the same time as station C transmits its hyperbolic frequency fc. Thus the control centre 100 operates to send system information to the craft 110 being aided, the centre 100 employing a data communications channel COM which is multiplexed on the carrier frequency of the transmitting station C.

As mentioned above, track guidance information is provided by the static lattice shown in dash lines 20 of FIG. 2, produced by the synchronised signals from a pair of fixed transmitting stations C and D. The signals from the transmitting station C are used to control the frequency contained in the signals from the transmitting station D so that the signals from station D have a predetermined set phase relationship to the signals from station C. Points at which the phase difference between signals received from stations C and D is the same lie on a hyperbola 20, with respective hyperbolae for respective phase differences. Thus, as the base line AB is also a hyperbola of the C and D transmitting stations, then a craft tracking on the line AB will experience the same phases from C and D wherever it is on the line AB. Thus it will know it is on track. Straight tracks may be produced, in one of two ways, according to the circumstances of each case. In one arrangement, the two transmitting stations C and D are sited on a base line which is bisected by the track. This track coincides with the central dashed line 20a. Alternatively (FIG. 3), transmitting stations C and D are sited so that the asymptotic part 18 of a chosen hyperbola 20 is aligned with the desired track (dot/dash line AB). When a curved track is to be followed by the craft, and the track approximates closely to a hyperbolic curve, curves of constant phase difference for track guidance are generated by siting the C and D transmitting stations assymetrically to the track (dot/dash line 17) as seen in FIG. 4. When the track is not a hyperbola, craft may compute the track from the fixed lattices produced by CD and AC or AD.

In practice, craft are unable to follow the moving positions of constant phase difference precisely under all circumstances. Therefore, tolerances are allowed along the track and to the left and right of the track. Each area thus created within the bounds of the tolerances may be referred to as a slot and is symmetrically disposed about the moving position or slot datum point on which it is based. The size of the slot is made sufficient to accommodate known relevant errors in the system in addition to errors arising in signal translation and response by the craft and is defined by suitable lattice lines.

Equipment on the craft will now be described with reference to FIG. 5.

In the craft there is one or more aerial systems or sensors 29 feeding signals to a receiver and comparator 30. The signals arise from transmitting stations A, B, C and D and a multiplexed data communications channel COM and are filtered into respective receivers/amplifiers 32A, 32B, 32C, 32D and 32COM and thence to demodulators 33A–D and 33 COM. The demodulated signals from 33A–D are fed to one or more of phase comparators 34, 35, 36 in the pattern shown. Comparator 34 is involved with resolving a craft navigational fix (and hence takes signals from 33A, 33C and 33D). Comparator 35 is involved with track guidance (and hence takes signals from 33C and 33D) and comparator 36 is involved with moving position and speed guidance relative to the moving lattice line 21A.

The initial tuning data for the tuner amplifiers 32A–32COM and demodulators 33A–33D will be injected into computer 31 using keyboard 43 and passed to 32A–32COM over line 48 and to 33A–33D over line 49. When in contact with the control centre further tuning data may be received over the communications channel 32COM and 33COM, stored in computer 31 and made effective as required. FIG. 5 shows for simplicity the demodulators 33A–D and comparators 34, 35 and 36 required to work in conjunction with, i.e. derive data from, their respective lattice or lattices to determine craft speed, track and position fixes. The processing facilities for use with coarse and fine lattices are not shown. The computer 31 has a craft heading input unit 51.

The slot comparator 36 compares the phase of the signal received from transmitting station A with that from transmitting station B and produces a voltage output signal proportional to the phase difference (Vs volts). This is digitised and fed to the computer 31 along a line 37 for comparison with stored values of slot datum volts, slot front limit volts and slot rear limit volts. So long as the craft (22 in FIG. 2) is operated so that the Vs volts lies within the band defined by the front and rear limit volts, then the craft can be confined within a slot indicated by the lines 60 of FIG. 2 which define the front and rear limits of the slot.

At the same time (and in comparable manner to that described for the comparison of the phase of signals from stations A and B) the phases of signals from stations C and D are compared in track comparator 35 to give a signal (Vt volts). This is digitised and fed to computer 31 along a line 38 and compared with stored values of track datum volts, track port limit volts and track starboard limit volts. Thus the craft can also be confined within a slot indicated by the lines 61 of FIG. 2. Lines 61 coupled with lines 60 uniquely define an exclusive shaded area 62 for the craft which is moving towards station B on track AB at a velocity locked to the velocity of movement of the line 21a.

The computer 31 has a first output 40 feeding a display 41 giving the position of the craft 22 in relation to the slot (shaded area 62 in FIG. 2) and a position fix in hyperbolic or geographical coordinates related to the fixed lattice produced by stations C, D, and a fixed lattice produced by stations A, C or A, D. At the same time the display can include advice and instructions received from the control centre 100 via the receiver (32COM), demodulator (33COM), amplifier (42), and computer 31. A keyboard 43 allows matters on the display, if acceptable, to be keyed into the computer 31 which then accepts them and directs a craft automatic control unit 44 via a second computer outlet 45 to keep the craft in the shaded area 62. A third outlet 46 from the computer allows the craft to signal periodically to a control centre to report, via a transmitter 47, the position of the craft in the system. For example, its position in its slot defined area 62 and regular reports on such matters as geographical or other coordinates together with lateral, axial and vertical errors from datum points and a warning in the event of departure from said datum points or other deviant situation such as if the craft moves outside area 62. Acceptance or other messages which the captain of the craft wishes to send to the control centre may also pass through outlet 46.

The slot datum points and hence the slots themselves can be set at intervals in space or intervals in time by inserting into the computers 31 of successive craft in a stream appropriate values of slot datum volts. The computers 31, in conjunction with their slot phase comparators 36 and craft control unit 44 will set the craft on respective hyperbolae 21 each having its own slot at a minimum interval from adjacent slots on other hyperbolae for safety purposes. Any changes in the slot interval will also require corresponding changes in the voltage values for the front and rear limits of slots.

When one track section crosses another, the separation between the slots on each track can be arranged so that the respective traffic on each track crosses in the gaps between the slots on the other track.

The separation between adjacent hyperbolae 21 expands as they get further from the base line AB. The expansion effect at each point in a hyperbolic lattice is equal to the cosecant of half the angle $2\epsilon$ subtended at the point by the positions A and B. When, in a moving lattice, hyperbola n moves a short distance to the position of hyperbola n+1 the expanded distances are traversed in the same time as the basic separation distance between n and n+1 on the base line AB. Consequently the speed of n at a distance from the base line will be equal to the speed at the base line multiplied by cosecant $\epsilon$. The locus of a point which moves and maintains equal values of $2\epsilon$ is the arc of a circle with line AB as its chord. Craft which cross these loci will accelerate or decelerate as they move towards areas of greater or lesser expansion. This effect is referred to as the Expansion Effect (E).

Another method of changing craft speed along the track is to manipulate the speed of the moving lattice. For example, when a single craft is to use a moving lattice at one time the speed of the moving lattice may be adjusted, as the craft proceeds, to produce either a constant or variable speed along straight or curved tracks as required. This facility may be carried to the ultimate and used to reduce the speed of a craft to zero or to start a craft from rest and accelerate it to a working or cruising speed: it could be applied, for example, to berth a ship. A further application might be to counter the speed variation caused by the Expansion Factor on an aircraft track above the base line AB: in this case several such moving lattices might be coordinated for use by a number of aircraft on one track. This method used a controlled rate of change in the difference between fa and fb. When the frequency difference or the rate of change of phase increases, the speed of movement of the hyperbolic pattern increases: and the converse is true. In fact, if the reduction continues until the two frequencies are equal, the hyperbolae come to rest.

In the methods described, all lines in the moving hyperbolic lattice move at speeds set by the relevant control centre. They have identical speeds and unchanging set intervals along the base line 10. Away from the base line they either accelerate and increase their intervals or decelerate and converge but they will never travel slower or become closer than at the base line. Either method may be used to control the acceleration and deceleration or retardation of craft in order to provide a required change of speed or, alternatively, to counter the result of the hyperbolic expansion effect.

Craft require to know their geographical position accurately to rendezvous with their allotted slot in the initial stage of using the system. They also need to be aware of their progress along the track as their slot proceeds. Accurate fixing for these purposes is obtained by reference to frequencies of signals from transmitting stations A and C or A and D. The phase comparison of either of these pairs of frequencies gives a stationary hyperbolic lattice such as the one shown (see lines 120) in FIG. 6. The track in FIG. 6 is the base line AB. Thus AC or AD fixed lattice is utilised in a manner now described by referring back to FIG. 5. In FIG. 5, the signals from transmitting stations A, C and D are fed from their respective demodulators 33 into the position phase comparator 34; the position phase comparator 34 compares the appropriate two frequencies of their respective signals and produces a voltage output Vp which is a function of the angle $\phi$ between the phases of the two signals. The digitised value Vp is fed on line 50 to the computer 31, which determines the hyperbola represented by this phase angle and computes the intersection of that hyperbola with the current track represented by Vt from comparator 35. This gives a navigational fix and such fixes are used to monitor progress of the craft along the track and to navigate to the initial rendezvous with the allotted slot on entry to the system. Thus the hyperbolae of FIG. 6 are used to determine the instant position of the craft. A and B will normally be outside the length of the base line used as track and the lattice in FIG. 6 prouced by A and C transmitting stations may be used in conjunction with the lattice produced by the stations C and D as shown in FIG. 2. Craft will join the track a short distance in from A and the computer can fix the position of the craft by use of the AC and CD lattices and, taking a heading from unit 51, can produce a course to the joining gate to rendezvous with the slot allotted by the control centre. In doing this, the computer will be receiving the slot information from stations A and B. It can use up spare time if necessary. It cannot make amends if the craft is late in starting this approach procedure.

The data frequencies used to produce the fixed and moving hyperbolic lattices (FIG. 2) are chosen to accord with the distance, speed and resolution factors in the system requirement. When the system uses radio frequencies compromise in the face of propagation and frequency allocation problems may be avoided by the use of carrier frequencies, suitable and available for each application, on which data frequencies and communication channels can be multiplexed, using established techniques.

When the multiplexing method uses frequency division channelling techniques, a correction factor may be applied in the craft, to counter any significant doppler effect on the channel frequencies. For this purpose the channel frequency is transmitted on the carrier frequency and the received version, modified by the doppler effect of the speed of the craft, is used to demodulate the hyperbolic data frequency from its channel.

With reference to FIG. 9, craft pass from one geographical section (X) to the next (Y) through a transit gate 90, at which point the respective slots of the two adjacent sections overlap for a suitable distance and time. This overlap or synchronisation may be achieved by nominating a master transmitting station in the chain of sections and using its frequencies as the initial values in a series of backward references along the chain of sections. These references and necessary actions to correct errors which they reveal are monitored and actioned by computers at the relevant control centre 100.

Communications are provided to enable the control centre 100 to allocate craft to slots, monitor the state of the system and adjust its parameters to suit changing circumstances and requirements within its design limits. The control centre 100 sends system information to craft under control using a data channel which is multiplexed on the carrier frequency of one of the transmitting stations A, B, C or D. Craft use a separate unidirectional channel to transmit to the control centre 100 automatically at pre-arranged intervals through transmitter 47. (FIG. 5).

The computers at the control centre 100 have functions in addition to those already mentioned, for example, monitoring the phasing of the signals provided by the A, B, C and D stations which produce the fixed and moving phase lattices. They store and, when required, display all relevant data about craft which are to come under control, are under control or have recently been under control. They store and display data required to enable controllers to allocate craft to appropriate slots at suitable heights or tracks. The computers receive, store and transmit all messages between control centre and craft, ensuring that they are transmitted in the proper sequence. They are required to give information and options to controllers to facilitate the control task—not to usurp the job of making decisions.

A system according to the invention could be used by craft not fitted to use the hyperbolic navigation elements of the invention or when operating outside the range of those elements, subject to possession by craft of compatible communications and computing systems with alternative navigation equipment. In these cases the control centre would generate dynamically in the computer the moving positions and dimensions of the train of slots moving along the track with the required speed and intervals. Craft would be given initial position and time datum with speed, reporting period, slot dimensions and identity. The craft computer would use data from its alternative navigation equipment and report as when working with the hyperbolic navigation equipment. Craft would be distinguished in the record, at the control centre, according to their particular navigation equipment in use.

One application of the invention could be to provide moving positions for aircraft along the track of a controlled airway.

Aircraft would be fitted with equipment of the type shown in FIG. 5. The aircraft captain would, either prior to take-off or whilst approaching the system in the air, obtain permission to join the system and pass his aircraft details and flight plan to the System Controller. The System Controller would reply with the system channel frequencies and data to initiate setting up the appropriate system in the aircraft, an example of which is illustrated by FIG. 5, and then pass over the system communications channel details, such as height, wind speed and direction, slot speed, rendezvous position and time, slot allocation identity and automatic communications data. These particulars would be shown on the display 41. When the captain has accepted these details, they would be entered into the computer 31 to become effective and the errors from the datum point of the allocated slot would be displayed together with the aircraft position in either hyperbolic or geographical coordinates. Navigation to the rendezvous would proceed with assistance from the system, but not necessarily under the control of the system. The aircraft would enter the rendezvous area at the allocated height and be manoeuvred to take up position in the allocated slot with the appropriate speed and heading. At this stage the computer output could be switched to the aircraft control system to enable automatic following of the slot at the allotted speed along the track or, alternatively, the aircraft could be flown through manual adjustments to the aircraft automatic flight installation with reference to the subject system. In this mode the system would measure errors in aircraft position relative to the allocated slot datum both laterally and longitudinally and produce the requisite visual and electronic outputs to initiate the application of corrective action to aircraft heading and speed. Concurrently, the aircraft system equipment would refer to the "AC" or "AD" lattice (FIG. 6) and the "CD" (FIG. 4) lattice to produce position fixes in hyperbolic or geographical coordinates to monitor progress along this track.

If it were intended to continue on the track into the region of a second moving lattice, the data relevant to the second lattice would be obtained and entered into the computer 31 prior to reaching a nominated position before the point of changeover to the second track section. This action would enable the computer 31 to sample the transmissions for the second track section. This sampling might be done on a time-division basis with one set of receivers or, alternatively, a multiple set of receivers might be carried to sample both sets of transmissions concurrently. In either case, the computer 31 would display the respective position errors relative to slot (1) in track section 1 and slot (2) in track section 2 to assist in achieving a smooth transition to section 2.

The departure from section 1 and joining of section 2 would be notified to the System Controller via the Control Computer on the ground over the automatic communication channel. In fact this would be one of the series of regular automatic transmissions made from the aircraft during the period beginning at a point in the pre-joining procedure and extending until clearance from the system after using one or more track sections.

The function and operation of the whole system would be executed by one or more System Controllers assisted by a no-break computer system with the following functions for example:

a. Receive and use relevant weather and environmental data.
b. Assess and display to Controller for acceptance the setting and changing of speeds for each height, with reference to traffic requirements, adjacent sectors and controls and weather factors.
c. Calculate slot separation, to coordinate aircraft transfer between sections, on basis of speeds allocated and weather factors.
d. Determine settings for frequencies of transmissions from station B for each direction along the track. Note that the frequencies of the A, C and D transmitting stations are fixed. Monitor maintenance of allotted frequencies and switch to standby equipment when necessary.
e. Determine slot data and boundaries for transmission to aircraft.
f. Receive and store aircraft flight plans with relevant aircraft data and aircraft communications data.
g. Advise allocation of slots on VDU (Visual Display Units); record actual allocation made by the Controller.
h. Allot automatic communication identification and time periods to aircraft.
i. Monitor aircraft positions, position errors and untoward events. Transmit warnings to aircraft and Controller as appropriate. Monitor all aircraft IN and OUT of the system.
j. Conduct auto communication with aircraft.
k. Display selected information on demand.
l. Display, on demand, all unallocated and unoccupied slots.
m. Display, on demand, emergency lanes, slots, channels and procedures.

The System Controller would have communication with aircraft through the computer on the automatic channel and on voice direct. He would have communications facilities with adjacent system controllers, airfield controllers and system engineer staff and would receive routine and specific met information.

A second application with some resemblance to the airway system would involve the control of marine vessels through a waterway. In this arrangement, the changing tide race would require to be monitored and used in calculating the speeds of the moving lattices. The system would enable the moving positions of craft to be maintained on tracks with required separation from other craft and their positions to be known by control without danger of radar misidentification. In an area such as the English Channel, for example, through traffic could be coordinated with cross-flow ferry traffic by interlinking their respective moving lattice transmissions so that the craft in each stream passed in the gaps of the other stream.

In a third application, the rate of change of phase of a transmission from B station may be increased, as stated above, to speed up the movement of the "AB" lattice or reduced to give a diminishing speed. The system may apply this effect to conduct craft from or to a berth or other point at which they may have stopped or be required to stop.

In this application, among others, control of the slot and hence effectively of the craft, may be exercised either from the control centre or transferred to the craft and exercised via the communications channel.

In another application, the system may be operative in liquids. Thus the movement and positions of submersible and submarine craft and devices may be controlled in water in both the horizontal and vertical planes.

The system may also have application in liquids other than water. For example, the control of devices in an oil environment.

The transmitting stations may be fixed to earth or be carried by other reference points such as an earth satellite or ship.

If controlled movement or navigation is to be aided in more than one dimension, for example vertically or laterally or both, the two pairs of transmitters may be supplemented by additional pairs to provide further fixed or moving lattices as required.

Such an arrangement is shown in FIG. 10 wherein an additional pair of transmitting stations E and F is provided. Stations A and B control vertical movement, by employing a movable lattice, whereas stations C and D, and stations E and F employ fixed lattices so as to provide guidance in vertical planes which intersect each other.

We claim:

1. A craft guidance system, comprising signal transmission station pairs operable to provide at least three intersecting hyperbolic lattices, one moving, the other two fixed, relative to each other; and, means whereby when translated by reference to the phase differences between the transmissions of each station pair, the lattices produce hyperbolic lines of position continuously in time at infinitely variable positions, the moving lattice travelling at the intended speed and in the direction of the craft using the system, one of the fixed lattices providing craft track guidance, and both fixed lattices together providing craft position fixes, the said one fixed lattice and the moving lattice together providing craft moving position guidance and the moving lattice providing craft speed guidance.

2. A system as claimed in claim 1, further comprising a control centre operable to send system information to craft being aided, the centre employing a data communications channel which is multiplexed on a carrier frequency of at least one of the transmitting stations.

3. A system as claimed in claim 1, further comprising: receivers, demodulators and comparators in the craft to employ the phase differences between the transmissions of each station pair and the multiplexed data communications channel; and, means whereby these transmissions are filtered into respective demodulators so that said demodulators and comparators derive the phase differences from the lattices to determine craft speed, track and position fixes.

4. A system as claimed in claim 1, further comprising means for providing a common time reference and operable to control a stream of craft such that data derived from the signal transmitting stations is locked to the common time reference whereby craft in the stream are maintained at regulated intervals with respect to each other.

5. A system as claimed in claim 1, wherein the craft comprises: means for automatically communicating with a control centre periodically to report on the position of craft in the system, using hyperbolic coordinates together with errors from datum points; and, means for emitting a warning signal in the event of departure from said datum points.

6. A system as claimed in claim 1, further comprising: means for controlling the movement of craft from one section of the system to another section thereof, said means comprising a transit gate at which portions of adjacent sections overlap.

7. A system as claimed in claim 1, wherein the craft comprises:
(a) means for receiving signals transmitted from the pairs of signal transmitting stations;
(b) a first phase comparator for resolving craft navigational fix from the received signals;
(c) a second phase comparator for resolving craft track guidance; and
(d) a third phase comparator for resolving craft position and speed on its track.

8. A system as claimed in claim 1, further comprising means for varying the speed of the moving lattice.

* * * * *